Patented Feb. 5, 1935

1,989,700

UNITED STATES PATENT OFFICE 1,989,700

MANUFACTURE OF ALDEHYDIC COMPOUNDS

Alfred T. Larson, Wilmington, Del., assignor to E. I. du Pont de Nemours & Company, Wilmington, Del., a corporation of Delaware No Drawing. Application May 23, 1933, Serial No. 672,462

8 Claims. (Cl. 260—136)

This invention relates to the manufacture of aldehydic compounds by reaction of hydrocarbons and their substitution products, with carbon monoxide and aluminum chloride.

It has long been known that aldehydes may be made by reaction of carbon monoxide with hydrocarbons, or their substitution products, under elevated pressure in the presence of aluminum chloride. This general reaction was first described by Gattermann, Ber. 30, 1622, and has been the subject of subsequent patents, notably German 98,706, 126,421, 281,212, 334,009, and 403,489. The reaction involves the formation of an intermediate product having the nature of an aldehyde-aluminum chloride complex, which on hydrolysis yields free aldehyde and aluminum chloride. So far as I am aware, this process has never heretofore been used industrially.

In the development of a commercial process for the manufacture of aldehydes by the general reaction above referred to it has been found that when carbon monoxide is introduced under pressure into a mixture of aluminum chloride and the appropriate hydrocarbon, the reaction to form the corresponding aldehyde proceeds only very slowly for a long time, but, once under way, the velocity increases progressively and satisfactory yields of aldehyde may be obtained, but only after a total lapse of time which makes the process unduly costly. For example, when carbon monoxide is introduced into about 2 parts by weight of benzene and 1 part by weight of aluminum chloride at a pressure of 68 atmospheres and 25°–30° C., only 20% of the aluminum chloride will have reacted at the end of 4 hours. Thereafter the reaction proceeds more rapidly, however, and a final maximum conversion of about 80% based on the aluminum chloride may be attained at the end of 10 hours.

The possibility of employing a catalyst for the purpose of shortening or eliminating this induction period has been investigated. It has been found that dry hydrogen chloride, the use of which is disclosed in German Patent 281,212, is such a catalyst for initiation of the reaction. The use of hydrogen chloride, however, involves the preparation and handling of an extra gaseous material, somewhat complicates the corrosion problem, and is accordingly to be avoided if possible. Water, in limited amounts, also is effective in shortening the induction period, but water is objectionable since its presence in the reaction system decreases the yield of aldehyde, based on aluminum chloride, each mol. of water present rendering an equivalent amount of aluminum chloride ineffective for the production of aldehyde.

My investigations have shown that the desired result of shortening the induction period, without sacrifice of aluminum chloride efficiency, may be attained by mixing with the initially introduced reactants, i. e. hydrocarbon (or substitution product), aluminum chloride, and carbon monoxide, a quantity of aldehyde-aluminum chloride complex, which may conveniently be a portion of the reaction product of previous quantities of hydrocarbon, carbon monoxide, and aluminum chloride. The effectiveness of the invention in reducing the induction period otherwise required is shown by the following example:

Example.—2 parts by weight of benzene and 1 part of finely divided anhydrous aluminum chloride are introduced into an autoclave, equipped with a suitable agitating device adapted to maintain the aluminum chloride in suspension, and provided also with a water jacket or other means for regulating the temperature. Carbon monoxide is introduced at a pressure of 68 atmospheres, this pressure and a temperature of 25° C. being maintained until maximum conversion of the benzene results. This is found to require approximately 10 hours. On hydrolysis of the major portion of the product, for example by pouring it onto ice, separating, and fractionally distilling the resultant oily layer, a yield of benzaldehyde corresponding to about 80%, based on the aluminum chloride initially introduced, is obtained.

In a second run the same proportions of benzene and aluminum chloride are introduced into the autoclave together with 0.25 parts by weight of unhydrolyzed reaction product obtained in the first run. On subjecting this mixture to the same carbon monoxide pressure and to the same temperature, maximum conversion is attained at the end of only 3.5 hours. On hydrolyzing the product a yield of 80%, based on the aluminum chloride, is found.

Thus, it will be seen that in the commercial manufacture of aldehydes greatly improved results may be obtained by effecting the reaction of the hydrocarbon, carbon monoxide, and aluminum chloride in the presence of a subsidiary amount, say upwards to 15% by weight (based on the hydrocarbon used), of the unhydrolyzed reaction product of hydrocarbon, carbon monoxide, and aluminum chloride. As above described, the required catalyst may be obtained by utilizing subsidiary amounts of the product of the previous run of reaction materials, the major part of which is hydrolyzed for the recovery of the desired aldehyde.

The advantages of this method over the use of other catalysts, especially those which render a certain amount of the aluminum chloride useless for the desired reaction, will readily be appreciated. Thus, not only water, previously referred to, but also the aldehydes themselves have been found to catalyze the reaction. However, if either water or the desired aldehyde is added, e. g. to the benzene and aluminum chloride which are to form benzaldehyde, the added water or aldehyde will react with aluminum chloride, making a substantial portion thereof useless for the conversion of benzene. This increases the cost of the process to a marked degree, since the cost of fresh aluminum chloride consumed in the synthesis is a large factor in the ultimate cost of the product.

It will be understood that the invention is not limited to the specific details hereinbefore set forth. Thus, it is applicable to the reaction of other aromatic hydrocarbons than benzene, for example alkyl-substituted benzenes, such as toluene and xylene, homologues of benzene, such as naphthalene and anthracene, cycloparaffins, such as clyclohexane, and substituted products of the foregoing, such as chlorbenzene, etc. The process may be employed within the wide range of temperatures and pressures at which the general reaction proceeds. Preferably I operate at a pressure in excess of 50 atmospheres and with a temperature within the range of 20° to 50° C. Various changes may be made in the method described without departing from the invention or sacrificing the advantages thereof.

I claim:

1. In a process for the manufacture of aldehydic compounds by the superatmospheric pressure reaction of carbon monoxide, aluminum chloride and a carbon-hydrogen compound selected from the group consisting of aromatic and cycloparaffin hydrocarbons, the step of initially submitting the said materials to reacting conditions in the presence of aldehyde-aluminum chloride complex obtainable by reaction of said carbon-hydrogen compound, carbon monoxide, and aluminum chloride.

2. Process as in claim 1, wherein the amount of aldehyde-aluminum chloride complex initially present is not in excess of 15% by weight of the carbon-hydrogen compound.

3. The process of producing an aldehydic compound which comprises subjecting a mixture of aluminum chloride and a carbon-hydrogen compound selected from the group consisting of aromatic and cycloparaffin hydrocarbons, to the action of carbon monoxide at a temperature of 20° to 50° C. and a pressure in excess of atmospheric until substantial reaction has occurred, subjecting a major portion of the reaction product to hydrolysis for the recovery of aldehydic compound therefrom, and mixing a subsidiary portion of said reaction product with further quantities of said carbon-hydrogen compound and aluminum chloride and reacting the resultant mixture with carbon monoxide under elevated pressure.

4. In a process for the manufacture of aldehydic compounds by the superatmospheric pressure reaction of carbon monoxide, aluminum chloride and a carbon-hydrogen compound selected from the group consisting of aromatic and cycloparaffin hydrocarbons, the step of submitting the said materials to reacting conditions in the presence of upward to 15% by weight of unhydrolyzed reaction product of a previous batch of the same raw materials.

5. In a process for the manufacture of benzaldehyde by reaction of carbon monoxide, benzene, and aluminum chloride under superatmospheric pressure, the step of submitting the said materials to reacting conditions in the presence of added benzaldehyde-aluminum chloride complex, obtainable by reaction of benzene, carbon monoxide, and aluminum chloride.

6. Process as in claim 5, wherein the amount of aldehyde-aluminum chloride complex initially present is not in excess of 15% by weight of the benzene.

7. The process of producing benzaldehyde which comprises subjecting a mixture of liquid benzene and aluminum chloride to the action of carbon monoxide at a temperature of 20 to 50° C. and a pressure in excess of atmospheric until substantial reaction has occurred, subjecting a major portion of the reaction product to hydrolysis for the recovery of benzaldehyde therefrom, and mixing a subsidiary portion of said reaction product with additional benzene and aluminum chloride and reacting the resultant mixture with carbon monoxide under elevated pressure.

8. In a process for the manufacture of benzaldehyde by reaction of carbon monoxide, benzene, and aluminum chloride under superatmospheric pressure, the step of submitting the said materials to reacting conditions in the presence of upward to 15% by weight of unhydrolyzed reaction product of a previous batch of the same raw materials.

ALFRED T. LARSON.